United States Patent
Bormann et al.

[15] 3,671,541
[45] June 20, 1972

[54] 1,2,2A,3,4,5-HEXAHYDRO-1-(2-IMIDAZOLIN-2-YLMETHYL)BENZ[CD]INDOLES

[72] Inventors: Gerhard Bormann, Basel; John Gmunder, Muttenz, both of Switzerland; Heinrich Wilkens, Brombach, Germany

[73] Assignee: Sandoz Ltd. (a/k/a Sandoz AG), Basle, Switzerland

[22] Filed: Aug. 19, 1970

[21] Appl. No.: 65,281

[30] Foreign Application Priority Data

Aug. 27, 1969 Switzerland...........................12967/69
March 31, 1970 Switzerland............................4703/70
April 6, 1970 Switzerland............................5039/70

[52] U.S. Cl........................260/309.6, 260/141, 260/313.1, 260/326.5 B, 260/326.62
[51] Int. Cl. .....................................................C07d 49/34
[58] Field of Search................................................260/309.6

[56] References Cited

UNITED STATES PATENTS 2,778,836  1/1957  Morren................................260/309.6
3,288,805  11/1966  Berg....................................260/309.6

FOREIGN PATENTS OR APPLICATIONS 1,506,407  11/1967  France................................260/309.6
1,549,283  11/1968  France................................260/309.6
1,016,514  1/1966  Great Britain......................260/309.6
265,662  3/1950  Switzerland.........................260/309.6
234,986  3/1945  Switzerland.........................260/309.6
235,953  6/1945  Switzerland.........................260/309.6

*Primary Examiner*—Natalie Trousof
*Attorney*—Gerald D. Sharkin, Robert S. Honor, Frederick H. Weinfeldt, Richard E. Vila and Walter F. Jewell

[57] ABSTRACT

The invention concerns compounds of the formula:

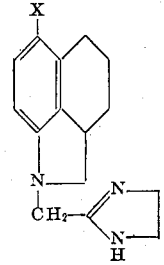

wherein X is hydrogen, halogen or methyl.

The compounds are useful peripheral and systemic vasoconstrictors.

4 Claims, No Drawings

1,2,2A,3,4,5-HEXAHYDRO-1-(2-IMIDAZOLIN-2-YLMETHYL)BENZ[CD]INDOLES

The present invention relates to new compounds of formula I,

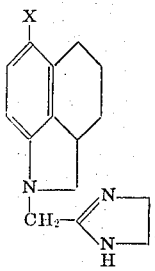

wherein X is hydrogen, halogen or methyl, as well as processes for the production thereof.

In accordance with the invention a process for the production of a compound of formula I comprises a. reacting a compound of formula II,

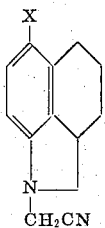

wherein X is as defined above, with ethylene diamine in the presence of carbon disulphide, or b. reacting a compound of formula III,

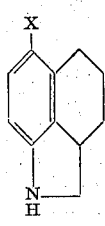

wherein X is as defined above, with 2-chloromethyl- or 2-bromomethyl-2-imidazoline.

Acid addition salts may be produced in known manner from the free bases and also vice versa.

The production of compounds of formula I in accordance with process a) of the invention may, for example, be effected by mixing a compound of formula II with ethylene diamine and adding carbon disulphide. An equimolar amount or a small excess of the diamine is preferably employed. Generally the molar ratio between the compound of formula II and the ethylene diamine lies preferably within the range 1 : 1 to 1 : 2 respectively, and the amount of carbon disulphide employed preferably comprises 0.1 to 0.5 mols per mol of the compound of formula II. The reaction mixture is conveniently heated at a bath temperature of between 100° and 150° C. for between 1½ and 4 hours, optionally in an inert organic solvent.

After the removal of the solvent, when used, by distillation, working up may be effected by dissolving the reaction mixture by the addition of an acid, e.g. an ethanolic hydrogen chloride solution, filtering the resulting solution until clear, e.g. with active charcoal, and crystallizing the resulting compound of formula I in the form of the acid addition salt thereof, e.g. by concentrating the filtrate.

The production of compounds of formula I in accordance with process b) of the invention may be effected by reacting a compound of formula III in the presence of an acid-binding agent, e.g. an organic base such as triethylamine or pyridine, in an inert organic solvent, for example a chlorinated aliphatic hydrocarbon such as chloroform, a lower alcohol such as n-propanol, or a cyclic ether such as dioxane, with 2-chloromethyl- or 2-bromomethyl-2-imidazoline, e.g. as an acid addition salt thereof such as the hydrochloride or hydrobromide, at an elevated temperature, preferably at the boiling temperature of the reaction mixture.

The compound of formula I may be isolated from the reaction mixture and purified in a conventional manner.

The hitherto unknown compounds of formula II, used as starting materials, may be produced by reacting a compound of formula III with a compound of formula IV,

Y—CH₂CN     IV wherein Y is halogen, preferably chlorine or bromine, in the presence of an acid-binding agent, for example a tertiary organic base, e.g. triethylamine, or an inorganic base, e.g. an alkali metal carbonate such as potassium carbonate or sodium carbonate, in an inert organic solvent, e.g. an aromatic hydrocarbon such as benzene, or a chlorinated alkane hydrocarbon such as chloroform. The reaction is preferably effected at an elevated temperature, e.g. at the boiling temperature of the reaction under reflux, and over a period of between 3 and 8 hours.

The compounds of formula III, with the exception of 1,2,2a,3,4,5hexahydrobenz[cd]indole, are new. They may be produced as follows:

i. 6-Chloro-1,2,2a,3,4,5-hexahydrobenz[cd]indolemay, for example, be produced by chlorinating 1-acetyl-1,2,2a,3,4,5-hexahydrobenz[cd]indole, e.g. by passing chlorine through a solution of 1-acetyl-1,2,2a,3,4,5-hexahydrobenz[cd]indole in an inert organic solvent such as a chlorinated alkane hydrocarbon, e.g. carbon tetrachloride, at room temperature, and deacetylating the resulting 1-acetyl-6-chloro-1,2,2a,-3,4,5-hexahydrobenz[cd]indole, e.g. by addition thereof to a mixture of glacial acetic acid/concentrated hydrochloric acid, and heating for about 1to 2 hours.

ii. 6-Bromo-1,2,2a,3,4,5-hexahydrobenz[cd]indole may, for example, be produced by brominating 1-acetyl-1,2,2a,3,4,5-hexahydrobenz[cd]1-
acetyl-6-bromo-1,2,2a,3,4,5-hexahydrobenz[cd]indole.

Bromination may, for example, be effected by the dropwise addition of bromine thereto in a suitable organic solvent, e.g. glacial acetic acid, at about 10° to 15° C., in the presence of a catalytic amount of hydrogen bromide.

Deacetylation may be effected as described in process (i) above for the production of 6-chloro-1,2,2a,3,4,5-hexahydrobenz[cd]-indole.

iii. 6-Fluoro-1,2,2a,3,4,5-hexahydrobenz[cd]indole and 6-iodo-1,2,-2a,3,4,5-hexahydrobenz[cd]indole may, for example, be produced by nitrating 1-acetyl-1,2,2a,3,4,5-hexahydrobenz[cd]indole, e.g. in glacial acetic acid, by the addition of fuming nitric acid at about 10° C., reducing the resulting 1-acetyl-6-nitro-1,2,2a,3,4,5-hexahydrobenz[cd]indole to the corresponding amino compound, diazotizing the resulting amino compound, e.g. with sodium nitrite in sulphuric acid solution at about 0° to 5° C., reacting the resulting diazonium salt, e.g. in accordance with Sandmeyer, to give the fluoro or iodo compounds respectively, and deacetylating these compounds, e.g. in accordance with process (i) above relating to the production of 6-chloro-1,2,2a,3,4,5-hexahydrobenz[cd]indole.

IV. 1,2,2a,3,4,5-Hexahydro-6-methylbenz[cd]indole may, for example, be obtained by reacting the diazonium salt described in process (iii) above in accordance with Sandmeyer, to give 1-acetyl-6-cyano-1,2,2a-3,4,5-hexahydrobenz[cd]indole, converting the resulting 1-acetyl-6-cyano-1, 2,2a,3,4,5-hexanydrobenz[cd]indole into 1-acetyl-6-formyl-1,-2,2a,3,4,5-hexahydrobenz[cd]indole, and reducing this compound, e.g. in accordance with Huang-Minlon, whereby the acetyl radical is simultaneously removed by hydrolysis under the reaction conditions.

The reduction of the nitro compound described in process (iii) above may, for example, be effected with hydrazine hydrate in the presence of Raney nickel and in an inert organic solvent, e.g. a lower alkanol such as methanol, at an elevated temperature, preferably 50° to 60° C. 1-Acetyl-6-formyl-1,2,2a,3,4,5-hexahydrobenz[cd]-indole employed in process (iv) above may, for example, be obtained by adding sodium hypophosphite and Raney nickel in a mixture of glacial acetic acid/pyridine/water to the corresponding 6-cyano compound and stirring for an extended period at a temperature of for example between 10° and 50° C.

Insofar as the production of the starting materials is not described, these are known or may be produced in accordance with known processes, or in a manner analogous to the processes described herein or to known processes.

The compounds of formula I and pharmaceutically acceptable acid addition salts thereof are useful because they possess pharmacological activity in animals. More particularly, the compounds are useful peripheral and systemic vasoconstrictors as indicated by α-stimulation properties illustrated by the vasoconstriction observed in the test with the isolated perfused hind leg of a rabbit and a stimulation of the effects of noradrenaline and tyramine in the narcotized dog.

For the abovementioned use, the dosage administered will of course vary depending on the compound employed, the mode of administration and the treatment desired. However, in general, satisfactory results are obtained at dosages of from about 0.01 to about 1 mg/kg animal body weight. For the larger mammals, the total daily dose is in the range of from about 1 to about 10 mg, conveniently given in divided doses 2 to 3 times a day, or in sustained release form. Dosage forms conveniently comprise from about 0.3 to about 10 milligrams of the compound, in association with a solid or liquid pharmaceutical carrier or diluent. Dependent on the treatment desired, dosage forms may be made available for oral administration or for topical administration, e.g. a liquid to be sprayed onto the mucous membrane.

In the following non-limitative Examples, all temperatures are indicated in degrees Centigrade and are uncorrected.

EXAMPLE 1

1,2,2a,3,4,5-Hexahydro-1-(2-imidazolin-2-ylmethyl)-benz[cd]indole [process a)]

1.26 cc of carbon disulphide are added to 13.4 g of 1-cyanomethyl-1,2,2a,3,4,5-hexahydrobenz[cd]indole and 5.9 cc of ethylene diamine, and the mixture is heated to a bath temperature of 120° for 1 hour and 45 minutes. The reaction mixture is dissolved in 33.8 cc of 2 N hydrochloric acid in ethanol, the solution is filtered with active charcoal until clear, and the filtrate is concentrated, whereby the hydrochloride of the title compound is obtained; this crystallizes from ethanol/acetone in prisms having a M.P. of 235°–238°.

The 1-cyanomethyl-1,2,2a,3,4,5-hexahydrobenz[cd]indole, used as starting material, is obtained as follows:

Reduction of 1,2,2a,3-tetrahydrobenz[cd]indole-5(4H)-one in accordance with Huang-Minlon yields 1,2,2a,3,4,5-hexahydrobenz-[cd]indole (prisms having a M.P. of 57°–59° from ether/petroleum ether). This is reacted with chloroacetonitrile in boiling benzene in the presence of triethyl amine to give 1-cyanomethyl-1,2,2a,3,4,5-hexahydrobenz[cd]indole. M.P. 74°–75° (from ether/petroleum ether).

The following compounds of formula I are obtained in analogous manner from the corresponding compounds of formula II as starting materials:

| Example | X | Compounds of Formula I M.p. | Recrystallization solvent | M.p. of the compounds of Formula II |
|---|---|---|---|---|
| 2 | CH₃ | 237–239° (hydrochloride) | Methanol/ether | 95–97° |
| 3 | Cl | 148–150° (hydrogen maleate) | Methanol/ether | 105–107° |

The 1-cyanomethyl-1,2,2a,3,4,5-hexahydro-6-methylbenz[cd]-indole, used as starting material in Example 2, is obtained as follows:

1-Acetyl-1,2,2a,3,4,5-hexahydrobenz[cd]indole is nitrated at 10° in glacial acetic acid with fuming nitric acid. The resulting 1-acetyl-1,2,2a,3,4,5-hexahydro-6-nitrobenz[cd]indole (M.P. 174°–175° from methylene chloride/ether) is reduced in methanol at 50°–60° with hydrazine hydrate in the presence of Raney nickel to give 1-acetyl-6-amino-1,2,2a,3,4,5-hexahydrobenz[cd]indole (M.P. 147°–149° from methylene chloride/petroleum ether). The amino compound is diazotized in sulphuric acid solution at 0°–5° with sodium nitrite, and the resulting diazonium salt is converted in accordance with Sandmeyer with cuprous cyanide at 60° into 1-acetyl-6-cyano-1,2,2a,3,4,5-hexahydrobenz[cd]indole (M.P. 169°–171° from methylene chloride/petroleum ether). This is stirred for 20 hours with sodium hypophosphite and Raney nickel in a mixture of glacial acetic acid/pyridine/water at room temperature to give 1-acetyl-6-formyl-1,2,2a,3,4,5-hexahydrobenz[cd]indole (M.P. 145°–147° from methylene chloride/petroleum ether), this is converted in accordance with the process of Huang-Minlon into 1,2,2a,3,4,5-hexahydro-6-methylbenz[cd]indole (M.P. 86°–88° from methanol/water), with the simultaneous removal of the acetyl group. This compound is reacted in boiling benzene with chloroacetonitrile in the presence of triethyl amine to give 1-cyanomethyl-1,2,2a,3,4,5-hexahydro-6-methylbenz[cd]indole (M.P. 95°–97° from ether/petroleum ether).

The 6-chloro-1-cyanomethyl-1,2,2a,3,4,5-hexahydrobenz[cd]indole, used as starting material in Example 3, is obtained as follows:

1-Acetyl-1,2,2a,3,4,5-hexahydrobenz[cd]indole is chlorinated at room temperature in carbon tetrachloride with the calculated amount of chlorine. The resulting 1-acetyl-6-chloro-1,2,2a,3,4,5-hexahydrobenz[cd]indole (M.P. 141°–143° from methylene chloride/petroleum ether) is saponified by boiling for 1½ hours in concentrated hydrochloric acid/glacial acetic acid, to give 6-chloro-1,2,2a,3,4,5-hexahydrobenz[cd]indole (M.P. 109°–111° from ether/petroleum ether). This is reacted in boiling benzene with chloroacetonitrile in the presence of triethyl amine, to give 6-chloro-1-cyanomethyl-1,2,2a,3,4,5-hexahydrobenz[cd]indole (M.P. 105°–107° from methylene chloride/petroleum ether).

EXAMPLE 4

6-Chloro-1,2,2a,3,4,5-hexahydro-1-(2-imidazolin-2-ylmethyl)benz[cd][process b)]

9.65 g of 6-chloro-1,2,2a,3,4,5-hexahydrobenz[cd]indole are dissolved in 125 cc of n-propanol, and after the addition of 15 cc of triethyl amine and 11.5 g of 2-chloromethyl-2-imidazoline hydrochloride, the mixture is heated to the boil for 5 hours. The reaction mixture is subsequently extracted between water and ethyl acetate. The aqueousphase is made alkaline with a dilute caustic soda solution and is shaken out with ethyl acetate. The ethyl acetate solution which has been dried over magnesium sulphate is evaporated to dryness. The crude base of the title compound obtained as evaporation residue is directly converted into the hydrogen maleate (M.P. 148°–150° from methanol/ether).

EXAMPLE 5

1,2,2a,3,4,5-Hexahydro-1-(2-imidazolin-2-ylmethyl)benz[cd]indole [process b)]

The title compound is obtained in a manner analogous to that described in Example 4, using 1,2,2a,3,4,5-hexahydrobenz[cd]indol in place of 6-chloro-1,2,a,3,4,5-hexahydrobenz[cd]indole; the compound is directly converted into the hydrochloride (prisms having a M.P. of 235°–238° from ethanol/acetone).

What is claimed is:

1. A compound of the formula

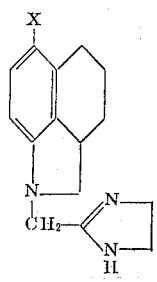
wherein X is hydrogen, halogen or methyl, or a pharmaceutically acceptable acid addition salt thereof.
2. The compound of claim 1, which is 1,2,2a,3,4,5-hexahydro-1-(2-imidazolin-2-ylmethyl)benz[cd]indole.
3. The compound of claim 1, which is 6-chloro-1,2,2a,3,4,5-hexahydro-1-(2-imidazolin-2-ylmethyl)benz[cd]indole.
4. The compound of claim 1, which is 6-methyl-1,2,2a,3,4,5-hexahydro-1-(2-imidazolin-2-ylmethyl)benz[cd]indole.
* * * * *